(12) United States Patent
Yu

(10) Patent No.: US 10,284,098 B2
(45) Date of Patent: May 7, 2019

(54) LOAD CURRENT ADJUSTING CIRCUIT AND ADJUSTING METHOD THEREOF

(71) Applicant: Silergy Semiconductor Technology (Hangzhou) LTD, Hangzhou, ZheJiang Provice (CN)

(72) Inventor: Limin Yu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/974,824

(22) Filed: May 9, 2018

(65) Prior Publication Data

US 2018/0331628 A1    Nov. 15, 2018

(30) Foreign Application Priority Data

May 11, 2017    (CN) .......................... 2017 1 0330708

(51) Int. Cl.
| | |
|---|---|
| H02M 3/335 | (2006.01) |
| H05B 33/08 | (2006.01) |
| H02M 1/08 | (2006.01) |
| H05B 41/282 | (2006.01) |

(52) U.S. Cl.
CPC ......... *H02M 3/33515* (2013.01); *H02M 1/08* (2013.01); *H05B 33/0815* (2013.01); *H05B 33/0845* (2013.01); *H05B 41/282* (2013.01); *Y02B 20/347* (2013.01)

(58) Field of Classification Search
CPC .......... H03K 19/17768; G06F 12/1408; G06F 21/72; G11C 16/22; H04L 9/3278
USPC ......................................................... 315/307
See application file for complete search history.

(56) References Cited

U.S. PATENT DOCUMENTS

| | | | |
|---|---|---|---|
| 7,023,182 B1 * | 4/2006 | Kleine ................. | H02M 3/157 323/212 |
| 8,913,404 B2 | 12/2014 | Xu | |
| 9,413,252 B2 | 8/2016 | Xu et al. | |
| 2008/0116871 A1 * | 5/2008 | Li ......................... | H02M 3/157 323/283 |
| 2013/0313974 A1 | 11/2013 | Fan et al. | |
| 2014/0132176 A1 | 5/2014 | Xu et al. | |

FOREIGN PATENT DOCUMENTS

CN    103731151 A    4/2014

* cited by examiner

*Primary Examiner* — Daniel D Chang
(74) *Attorney, Agent, or Firm* — Michael C. Stephens, Jr.

(57) ABSTRACT

A load current adjusting circuit can include: a counter configured to generate first and second digital signals in accordance with a pulse signal, where a numerical relationship between the first and second digital signals is determined in accordance with a duty cycle of the pulse signal; and an adjusting circuit configured to adjust a load current to vary along with the duty cycle of the pulse signal in accordance with the first and second digital signals.

20 Claims, 8 Drawing Sheets

LOAD CURRENT ADJUSTING CIRCUIT AND ADJUSTING METHOD THEREOF

RELATED APPLICATIONS

This application claims the benefit of Chinese Patent Application No. 201710330708.7, filed on May 11, 2017, which is incorporated herein by reference in its entirety.

FIELD OF THE INVENTION

The present invention generally relates to the field of power electronics, and more particularly to load current adjusting circuitry and associated adjusting methods.

BACKGROUND

Light-emitting diodes (LEDs) have become a new generation of green light sources with their long life, high light efficiency, and environmental friendliness. At present, LED not only replaces a common existing light sources in the traditional lighting field, but may also gradually be applied in applications with higher dimming requirements, such as backlight illumination in a liquid crystal display (LCD). When designing a load current adjusting circuit for the LED, a load current flowing through the LED may be adjusted in order to achieve dimming of the LED.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
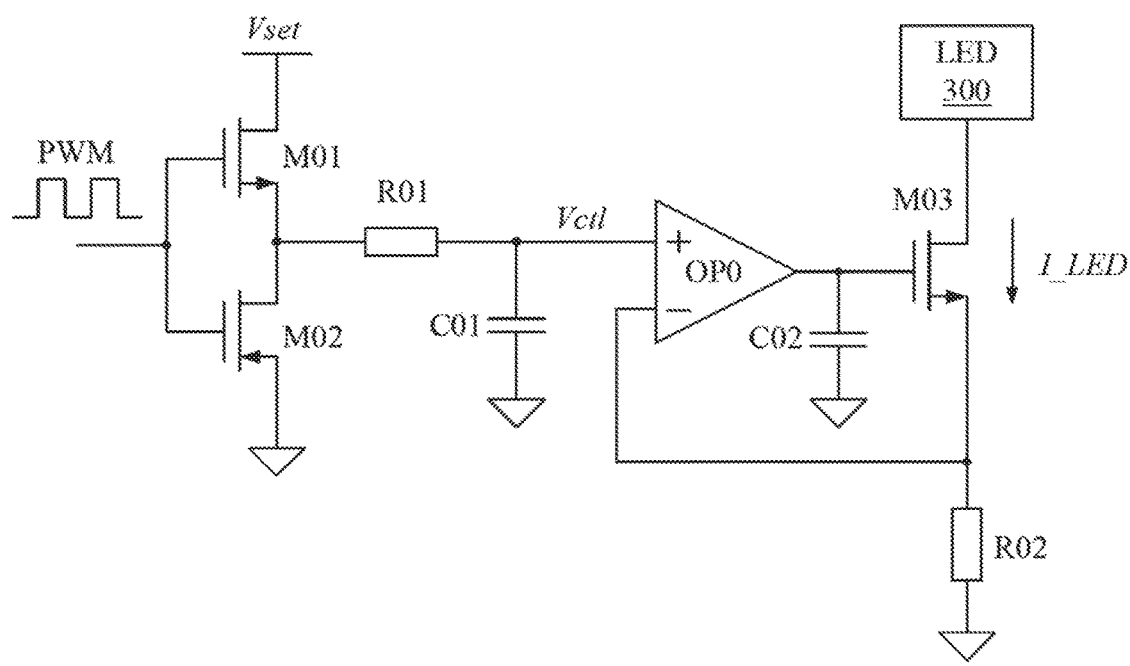
FIG. 1 is a schematic block diagram of an example analog dimming circuit.

Referring now to FIG. 1, shown is a schematic block diagram of an example analog dimming circuit. Such an analog dimming method may generally be used in order to adjust the brightness of the light-emitting diode (LED). For example, a passive filter can be used to filter pulse signal pulse-width modulation (PWM) into a direct current signal, in order to achieve an analog dimming effect. In FIG. 1, transistors M01 and M02 can be complementarily turned on, such that when pulse signal PWM is high, transistor M01 is on and transistor M02 is off, and when pulse signal PWM is low, transistor M01 is off and transistor M02 is on. A result of multiplying duty cycle D_pwm of pulse signal PWM by reference voltage Vset can thus be obtained. Resistor R01 and capacitor C01 can perform voltage filtering at a common node of transistors M01 and M02 in order to generate analog dimming signal Vct1 at one terminal of capacitor C01. Operational amplifier OP0 can receive analog dimming signal Vct1 at a non-inverting input terminal, and a sampling signal representing load current I_LED of LED load 300 at an inverting terminal, and may generate an error signal at an output terminal that can be compensated by compensation capacitor C02. A voltage at one terminal of compensation capacitor C02 can be used as a control signal of dimming control transistor M03, and may control dimming control transistor M03 to operate in a linear region, in order to control load current I_LED flowing through LED load 300 to achieve dimming. For example, load current I_LED can be calculated by the following formula (1).

$$I\_LED = (Vset \times D\_pwm)/R02 \qquad (1)$$

However, one disadvantage of this approach is that, when a frequency of the pulse signal PWM signal is relatively small, the corresponding time constant (e.g., a product of the resistance of resistor R01 and the capacitance of capacitor C01) may be increased to achieve a better filtering effect, such that analog dimming signal Vct1 can have a smaller ripple and approximate a DC voltage. Since the time constant is in direct proportion to sizes of resistor R01 and capacitor C01, the lower a frequency of pulse signal PWM is, the larger the sizes of the resistor and capacitor. Furthermore, the sizes of the resistor and capacitor may not be made sufficiently large inside a chip/IC, such that that when there is no external filtering, the frequency of pulse signal PWM may be severely limited. In addition, when load current I_LED of the LED load obtained by utilizing above approach is decreased with duty cycle D_pwm, analog dimming signal Vct1 may also be decreased, where analog dimming signal Vct1 can be calculated by the following formula (2).

$$Vct1 = Vset \times D\_pwm \qquad (2)$$

When duty cycle D_pwm is decreased to a very small value, analog dimming signal Vct1 may also be very small, which can result in a significant increase in the effect of errors caused by an offset voltage of operational amplifier OP0. In summary, a frequency range of pulse signal PWM can be limited by utilizing such an approach.

In one embodiment, a load current adjusting circuit can include: (i) a counter configured to generate first and second digital signals in accordance with a pulse signal, where a numerical relationship between the first and second digital signals is determined in accordance with a duty cycle of the pulse signal; and (ii) an adjusting circuit configured to adjust a load current to vary along with the duty cycle of the pulse signal in accordance with the first and second digital signals.

Figure 2:
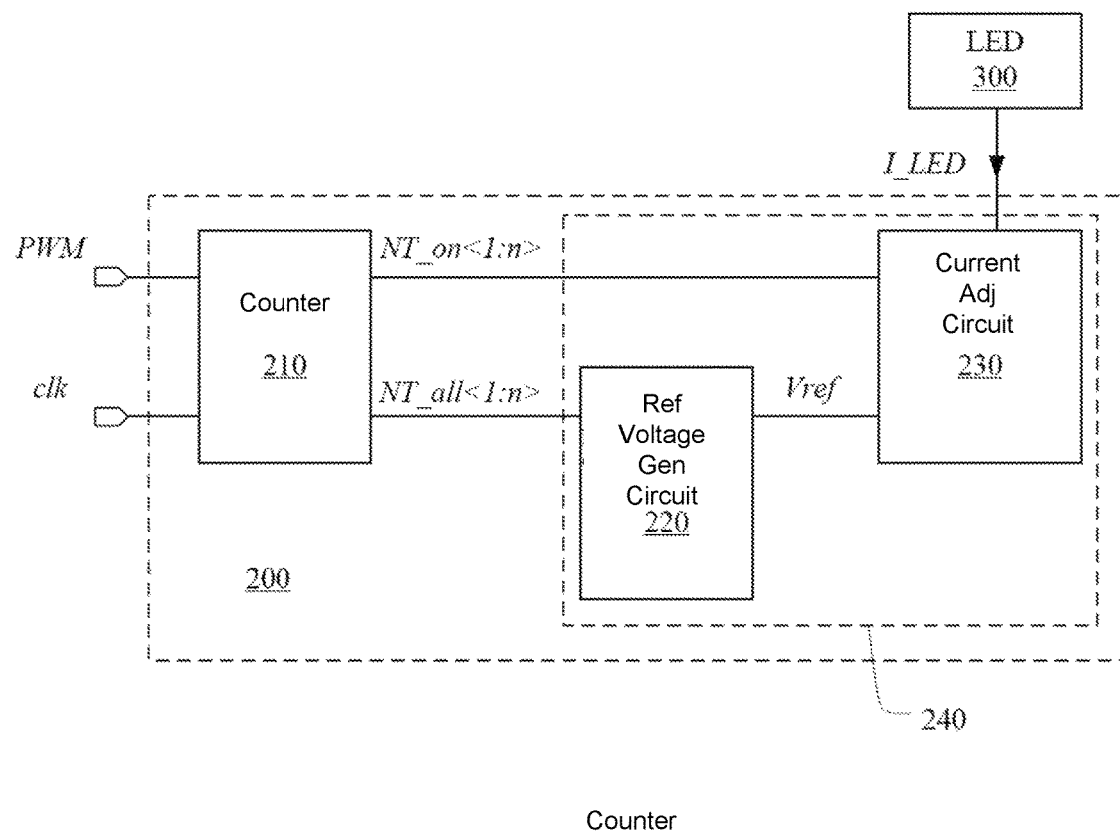
FIG. 2 is a schematic block diagram of a first example load current adjusting circuit, in accordance with embodiments of the present invention.

Referring now to FIG. 2, shown is a schematic block diagram of a first example load current adjusting circuit, in accordance with embodiments of the present invention. In this particular example, load current adjusting circuit 200 can adjust load current I_LED flowing through a LED load 300 in order to achieve dimming. Load current adjusting circuit 200 can include counter 210 and adjusting unit 240, where adjusting unit 240 can include reference voltage generating circuit 220 and current adjusting circuit 230.

Counter 210 can count clock signal clk during each cycle of pulse signal PWM, in order to generate digital signal NT_all<1:n> that represents a total cycle length of pulse signal PWM, and digital signal NT_on<1:n> that represents an active level length of pulse signal PWM. The ratio of digital signal NT_on<1:n> to digital signal NT_all<1:n> is duty cycle D_pwm of pulse signal PWM, where n is a positive integer. Digital signal NT_all<1:n> is a count value obtained by counting clock signal clk in a period from the start of cycle T of pulse signal PWM to the end of cycle T. In this example, a high level of pulse signal PWM is active. That is, digital signal NT_on<1:n> is a count value obtained by counting clock signal clk in a period from the start of the high level of pulse signal PWM to the end of the high level of pulse signal PWM within cycle T, such that digital signal NT_on<1:n> represents a high level length of pulse signal PWM in cycle T.

In another example, pulse signal PWM may alternatively be active for a low level. In this alternative example, digital signal NT_on<1:n> can represent a low level length of pulse signal PWM in cycle T. In this case, digital signal NT_on<1:n> is a count value obtained by counting clock signal clk in a period from the start of the low level of the pulse signal PWM to the end of the low level of pulse signal PWM. As another alternative example, digital signal NT_on<1:n> can alternatively represent an inactive level length of pulse signal PWM.

Reference voltage generating circuit 220 can receive digital signal NT_all<1:n> generated by counter 210, and generate reference voltage Vref therefrom. Current adjusting circuit 230 can receive digital signal NT_on<1:n> generated by counter 210 and reference voltage Vref generated by reference voltage generating circuit 220. Current adjusting circuit 230 can include current adjusting branches controlled by digital signal NT_on<1:n>, and the sum of currents in each current adjusting branch may be equal to load current I_LED flowing through LED 300. Current adjusting circuit 230 can control each of internal current adjusting branches according to digital signal NT_on<1:n> and reference voltage Vref, in order to control load current I_LED. This can essentially make load current I_LED and the duty cycle of pulse signal PWM be related in order to achieve dimming by utilizing pulse signal PWM.

Figure 3:
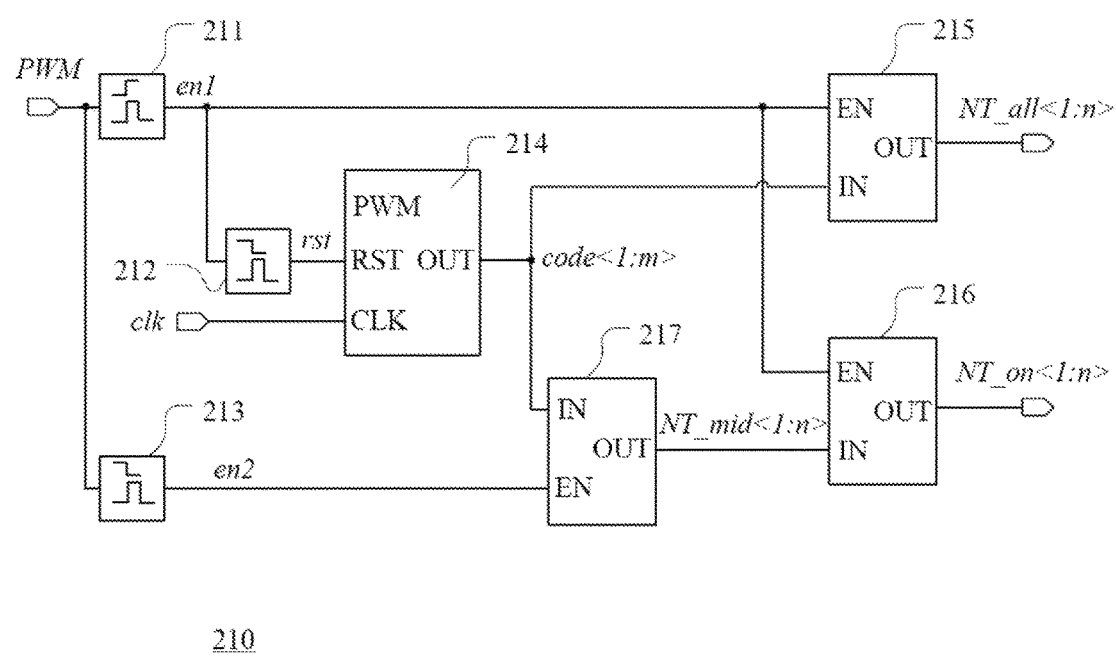
FIG. 3 is a schematic block diagram of an example counter in the load current adjusting circuit of FIG. 2, in accordance with embodiments of the present invention.

Referring now to FIG. 3, shown is a schematic block diagram of an example counter in the load current adjusting circuit of FIG. 2, in accordance with embodiments of the present invention. In this particular example, counter 210 can include pulse generators 211, 212, and 213, counter 214, and memories 215, 216, and 217, in order to synchronously obtain digital signal NT_all<1:n> and digital signal NT_on<1:n> while avoiding a signal conflict. For example, pulse generator 211 may be a short pulse generator triggered by a rising edge to generate enable signal en1 of memory 215 in accordance with pulse signal PWM. When the rising edge of pulse signal PWM comes, enable signal en1 can be an active short pulse duration. For example, pulse generator 212 may be a short pulse generator triggered by a falling edge to generate reset signal rst of counter 214 in accordance with enable signal en1. When the falling edge of enable signal en1 comes, reset signal rst can be an active short pulse to reset a count value code<1:m> of counter 214.

For example, pulse generator 213 may be a short pulse generator triggered by a falling edge to generate enable signal en2 of memory 217 in accordance with pulse signal PWM. When the falling edge of pulse signal PWM comes, enable signal en2 can be an active short pulse. The counter 214 may have an input terminal, a reset terminal, a clock terminal, and an output terminal. In addition, counter 214 can receive pulse signal PWM at the input terminal, reset signal rst at the reset terminal, and clock signal clk at the clock terminal. Counter 214 can start to count clock signal clk from an initial value (e.g., counting rising or falling edges of clock signal clk, etc.) after counter 214 is reset by reset signal rst, and may generate count value code<1:m> at the output terminal, where m is a positive integer. The frequency of clock signal clk is, e.g., much greater than the frequency of pulse signal PWM.

Memory 215 may have an enable terminal, an input terminal, and an output terminal for generating digital signal NT_all<1:n>. Memory 215 can receive enable signal en1 at the enable terminal. When enable signal en1 is active, memory 215 can convert and store count value code<1:m> which may be received at the input terminal and generated by counter 214 as digital signal NT_all<1:n>, and output digital signal NT_all<1:n> at the output terminal. When enable signal en1 is inactive, digital signal NT_all<1:n> stored and generated by memory 215 can remain unchanged. The integer "n" (e.g., the number of bits of digital signals) can represent a resolution of the load current adjusting circuit. The larger n is, the higher the resolution is, such that the integer n can be set in accordance with the application. The integer m is generally greater than n; that is, the number of bits of count value code<1:m> is greater than the number of bits of digital signals NT_all<1:n> and NT_on<1:n>.

Memory 217 may have an enable terminal, an input terminal, and an output terminal that can provide intermediate signal NT_mid<1:n> at the output terminal. Memory 217 can receive enable signal en2 at the enable terminal. When enable signal en2 is active, memory 217 can convert and store count value code<1:m> which may be received at the input terminal and generated by counter 214 as intermediate signal NT_mid<1:n>, and can output intermediate signal NT_mid<1:n> at the output terminal. When enable signal en2 is inactive, intermediate signal NT_mid<1:n> stored and generated by memory 217 can remain unchanged.

Memory 216 may have an enable terminal, an input terminal, and an output terminal that can provide digital signal NT_on<1:n> at the output terminal. Memory 216 can receive enable signal en1 at the enable terminal. When enable signal en1 is active, memory 216 can store intermediate signal NT_mid<1:n> which may be received at the input terminal and generated by the output terminal of memory 217 as digital signal NT_on<1:n>, and can output intermediate signal NT_mid<1:n> at the output terminal. When enable signal en1 is inactive, digital signal NT_on<1:n> stored and generated by memory 216 can remain unchanged.

The connection relationships, signal relationships, and basic functions of the counter 210 are described in FIG. 3.

The operating process of counter 210 will be described in detail through a sequence diagram of each signal in counter 210. It should be noted that the above description of FIG. 3 is only one example of the present invention. Those skilled in the art will recognize that suitable modifications and changes to achieve the same purpose are supported in particular embodiments.

Figure 4:
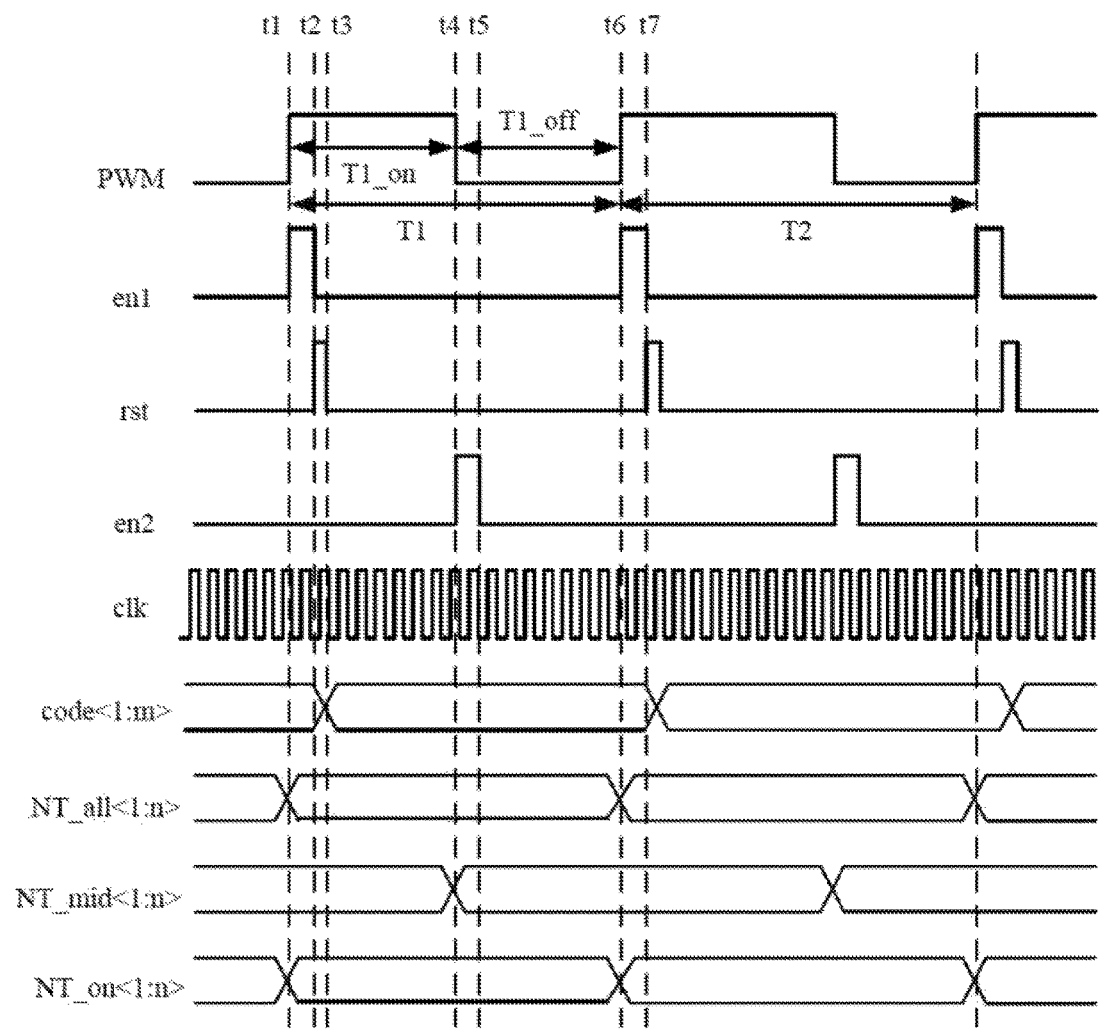
FIG. 4 is a waveform diagram of an example sequential operating relationship of each signal in the counter of FIG. 3, in accordance with embodiments of the present invention.

Referring now to FIG. 4, shown is a waveform diagram of an example sequential operating relationship of each signal in the counter of FIG. 3, in accordance with embodiments of the present invention. In this particular example, when a rising edge of pulse signal PWM comes at time t1, enable signal en1 generated by pulse generator 211 can be an active short pulse until time t2. A period length between time t1 and time t2 can be much less than a high level duration T1_on of pulse signal PWM during the cycle T1. In some examples, digital signal may also represent a low level duration Toff of pulse signal PWM, where duty cycle D_pwm of pulse signal PWM can be a ratio of an inverting signal of digital signal NT_on<1:n> to digital signal NT_all<1:n>.

At time t2, since a falling edge of enable signal en1 comes, pulse generator 212 is triggered, and reset signal rst can be an active short pulse until time t3. A period length between time t1 and time t3 can be much less than high level duration T1_on of pulse signal PWM during cycle T1. At this time, count value code<1:m> generated by counter 214 can be reset to an initial value and the counter can begin to count until next active short pulse of reset signal rst comes.

At time t4 (equal to t1+T1_on), when a falling edge of pulse signal PWM comes, pulse generator 213 may be triggered, thus enable signal en2 can be an active short pulse until time t5. A period length between time t4 and time t5 can be much less than low level duration T1_off of pulse signal PWM in the cycle T1. At time t4, the quotient of count value code<1:m> generated by counter 214 and frequency fclk of clock signal clk is equal to high level duration T1_on of pulse signal PWM in cycle T1. Also, memory 217 triggered to be turned on by the active short pulse of enable signal en2 can update intermediate signal NT_mid<1:n> stored and generated internally in accordance with present count value code<1:m>, such that the intermediate signal NT_mid<1:n> can represent high level duration T1_on of cycle T1.

At time t6 (equal to t1+T1_on+T1_off), when a next rising edge of pulse signal PWM comes, the quotient of the count value code<1:m> generated by counter 214 and frequency fclk of clock signal clk may be equal to last cycle duration T1_on+T1_off of pulse signal PWM. At this time, enable signal en1 generated by pulse generator 211 can be an active short pulse, which can trigger both memory 215 and memory 216 to be turned on, such that memory 215 can update digital signal NT_all<1:n> stored internally and generated in accordance with the count value code<1:m>. Also, memory 216 can update digital signal NT_on<1:n> stored internally and generated in accordance with intermediate signal NT_mid<1:n>. Thus, digital signal NT_all<1:n> can represent the total duration of cycle T1, and digital signal NT_on<1:n> can represent high level duration T1_on of cycle T1. Then, digital signals NT_all<1:n> and NT_on<1:n> generated by counter 210 can respectively represent the total duration of cycle T1 and high level duration T1_on, such that the ratio of digital signal NT_on<1:n> to digital signal NT_all<1:n> is equal to duty cycle D_pwm of pulse signal PWM in cycle T1.

At time t7 (equal to t2+T1_on+T1_off), when the falling edge of enable signal en1 comes, pulse generator 212 may be triggered and reset signal rst can be an active short pulse. Thus, counter 214 can reset count value code<1:m> to the initial value, and may start to count again. Counter 210 can begin to detect the total duration, the high level duration, and the duty cycle of cycle T2, and may generate digital signals NT_all<1:n> and NT_on<1:n>. For example, since the active short pulse duration of enable signal en1 and reset signal rst may affect the counting accuracy of the active level duration of pulse signal PWM in some cases, the initial value of counter 214 can be set as a non-zero value (e.g., the initial value of counter 214 can be set as a cycle number of clock signal clk corresponding to the sum of the durations of the active short pulses of enable signal en1 and reset signal rst), in order to obtain a more accurate digital signal NT_on<1:n>.

Figure 5:
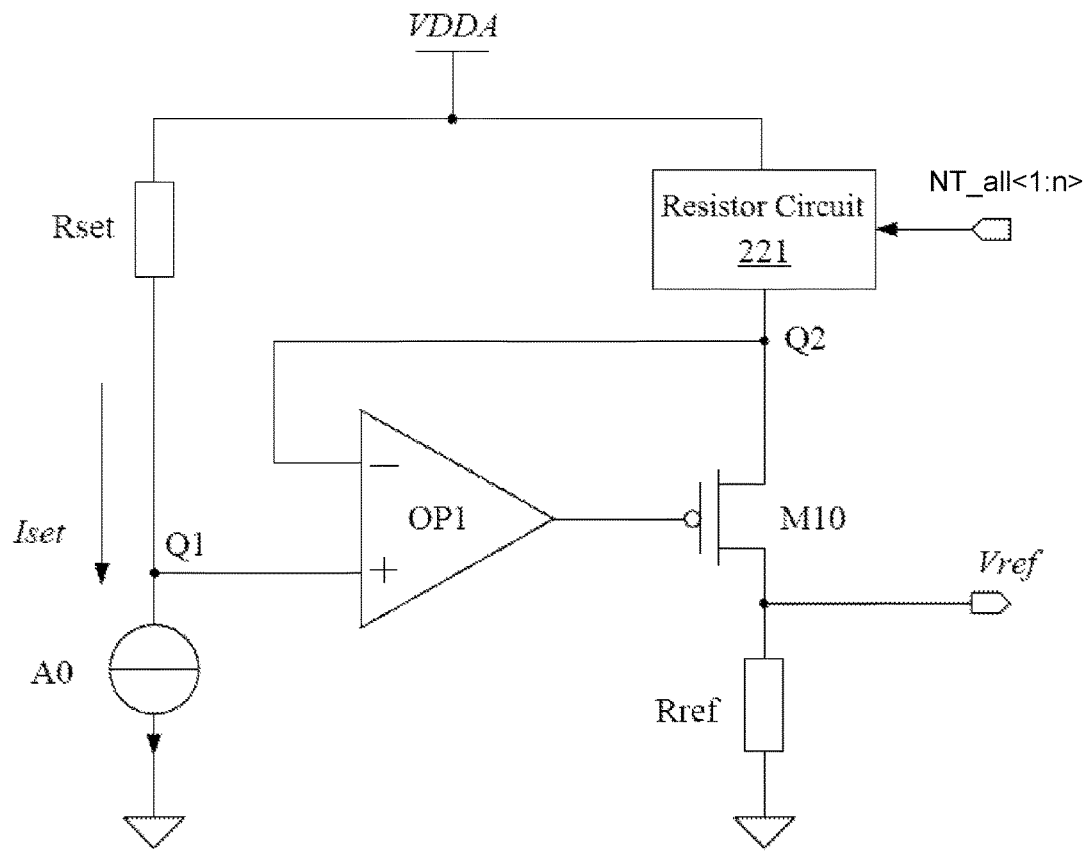
FIG. 5 is a schematic block diagram of an example reference voltage generating circuit in an example load current adjusting circuit, in accordance with embodiments of the present invention.
Figure 6:
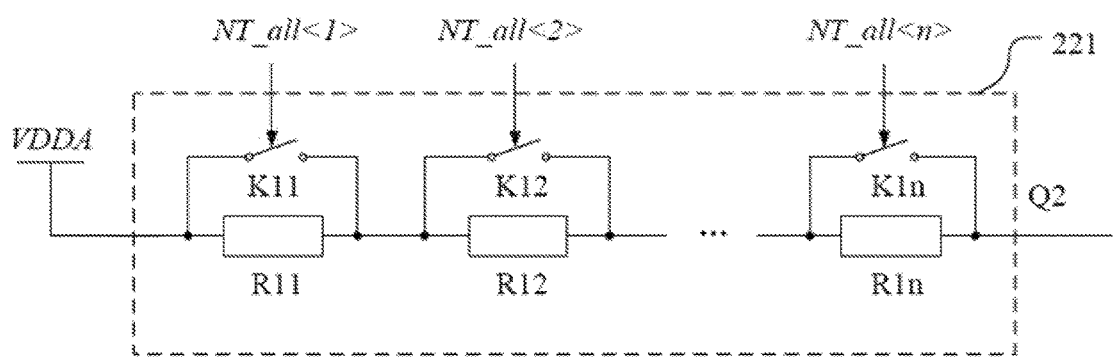
FIG. 6 is a schematic block diagram of an example resistor circuit in an example reference voltage generating circuit, in accordance with embodiments of the present invention.

Referring now to FIG. 5, shown is a schematic block diagram of an example reference voltage generating circuit in an example load current adjusting circuit, in accordance with embodiments of the present invention. Referring also to FIG. 6, shown is a schematic block diagram of an example resistor circuit in an example reference voltage generating circuit, in accordance with embodiments of the present invention. In FIG. 5, reference voltage generating circuit 220 in load current adjusting circuit 200 can include operational amplifier OP1, resistor circuit 221, transistor M10, resistors Rset and Rref, and current source A0.

Resistor circuit 221 may externally show equivalent resistor R1x, which can be controlled by digital signal NT_all<1:n>. One terminal of equivalent resistor R1x can receive supply voltage VDDA, and another terminal can connect to an inverting input terminal of operational amplifier OP1 and a first path terminal of transistor M10. A second path terminal of transistor M10 can connect to one terminal of resistor Rref, and may provide reference voltage Vref. A control terminal of transistor M10 can connect to an output terminal of operational amplifier OP1, and another terminal of resistor Rref can be grounded. A positive terminal of current source A0 can connect to a non-inverting input terminal of operational amplifier OP1 and one terminal of resistor Rset. A negative terminal of current source A0 may be grounded, and another terminal of resistor Rset can receive supply voltage VDDA.

As one example, resistor circuit 221 can include n switches K11 to K1n and n series resistors R11 to R1n, where each resistor can respectively be connected in parallel with a corresponding numbered switch. As mentioned above, digital signal NT_all<1:n> can be a digital signal including n bits, which are NT_all<1> to NT_all<n> from the lowest bit to the highest bit. Switches K11 to K1n can respectively correspond to be controlled by the first bit NT_all<1> to the nth bit NT_all<n> of digital signal NT_all<1:n>. In order to make resistor circuit 221 behave as equivalent resistor R1x with different resistance under the control of digital signal NT_all<1:n>, resistors R11 to R1n may progressively increase. For example, each of switches K11-K1n can be implemented with N-channel MOSFETs.

A node connecting resistor Rset and current source A0 may be denoted as Q1, and a node connecting resistor circuit 221 and the inverting input of operational amplifier OP1 may be denoted as Q2. The operating principle of reference voltage generating circuit 220 is that current source A0 can provide preset current Iset, thus a voltage at node Q1 can be equal to VDDA−Iset×Rset. When transistor M10 is turned on, a voltage at node Q2 can be equal to the voltage at node Q1 according to the virtual short principle of the operational amplifier, such that current Iref flowing through resistor circuit 221, transistor M10, and resistor Rref can be related with preset current Iset, resistor Rset, and equivalent resistor R1x (e.g., controlled by digital signal NT_all<1:n>) of resistor circuit 221. Then, reference voltage Vref can be calculated by the following formula (3).

$$V\text{ref}=(R\text{set}\cdot I\text{set}/R1x)\cdot R\text{ref}=(R\text{set}\cdot I\text{set}\cdot R\text{ref})/R1x \quad (3)$$

for example preset current Iset, resistor Rset and resistor Rref are all set values, and equivalent resistor R1x of resistor circuit 221 may be determined by digital signal NT_all<1:n>, such that reference voltage Vref can be determined by digital signal NT_all<1:n>. For example, resistors R11 to R1n in resistor circuit 221 shown in FIG. 6 may be designed as: $2^{n-1}\cdot R11=2^{n-2}\cdot R12= \ldots =2\cdot R1(n-1)=R1n=2^{n-1}\cdot Ra$, where Ra is a preset first resistance unit value, and then in accordance with a structure of resistor circuit 221 shown in FIG. 6, equivalent resistor R1x of resistor circuit 221 can be calculated by the following formula (4).

$$R1x=NT\_\text{all}<n:1>\cdot Ra \quad (4)$$

As a result, reference voltage Vref can be calculated by the following formula (5).

$$V\text{ref}=(R\text{set}\cdot I\text{set}\cdot R\text{ref})/R1x=(R\text{set}\cdot I\text{set}\cdot R\text{ref})/(NT\_\text{all}<n:1>\cdot Ra) \quad (5)$$

For example, preset current Iset, resistor Rset, resistor Rref, and resistance unit value Ra may all be set values, and reference voltage Vref can be inversely proportional to digital signal NT_all<1:n>.

Figure 7:
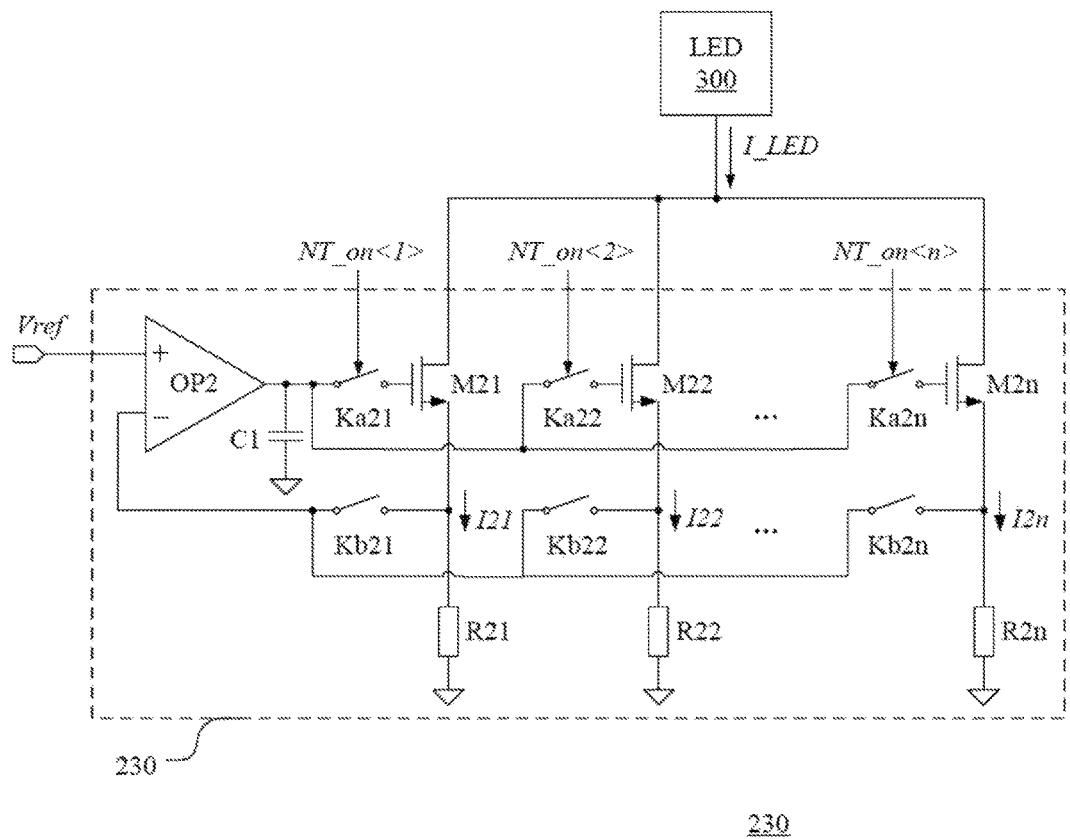
FIG. 7 is a schematic block diagram of an example current adjusting circuit in an example load current adjusting circuit, in accordance with embodiments of the present invention.

Referring now to FIG. 7, shown is a schematic block diagram of an example current adjusting circuit in an example load current adjusting circuit, in accordance with embodiments of the present invention. In this particular example, current adjustment circuit 230 in load current adjustment circuit 240 can include operational amplifier OP2, capacitor C1, n switches Ka (Ka21 to Ka2n), n switches Kb (Kb21 to Kb2n), n transistors M21 to M2n, and n resistors R21 to R2n. Operational amplifier OP2 may have an output terminal connected to one terminal of capacitor C1, and can receive reference voltage Vref generated by the reference voltage generating circuit 220 at a non-inverting input terminal, and another terminal of capacitor C1 may be grounded.

In current adjusting circuit 230, n transistors M21 to M2n can respectively be connected in series with corresponding n resistors R21 to R2n between an adjusting control terminal of LED and the ground to form n current adjusting branches. The on/off state of each current adjusting branches can be controlled by a corresponding bit in digital signal NT_on<1:n> (e.g., by controlling switches Ka and Kb corresponding to the current adjusting branch). Taking a structural connection relationship of one of current adjustment branches as an example, transistor M21 may have a first path terminal connected to the adjusting control terminal of LED, a second path terminal connected to one terminal of resistor R21 and one terminal of the corresponding switch Kb21, and a control terminal connected to one terminal of the corresponding switch Ka21. Another terminal of resistor R21 can be grounded, operational amplifier OP2 may have an output terminal connected to another terminal of switch Ka21, and an inverting input terminal can connect to another terminal of switch Kb21.

Switches Ka21 and Kb21 can be synchronous switches, and both may be controlled by lowest bit NT_on<1> of digital signal NT_on<1:n>. When switches Ka21 and Kb21 are turned on by NT_on<1>, transistor M21 can be turned on, and current I21 in this current adjusting branch can be calculated by the following formula (6).

$$I21=V\text{ref}/R21 \quad (6)$$

When switches Ka21 and Kb21 are turned off, transistor M21 can be turned off, and current I21 in this current adjustment branch can be equal to zero. Therefore, when the lowest bit NT_on<1> of digital signal NT_on<1:n> is high, switches Ka21 and Kb21 can be turned on, and current I21 in this current adjusting branch can be calculated by the following formula (7).

$$I21=NT\_\text{on}<1>\cdot V\text{ref}/R21 \quad (7)$$

The structural connection of the other current adjusting branches is consistent with the current adjusting branch described above, whereby the resistances can be set as R21>R22>R23> . . . >R2n. The current in each current adjustment branch can be respectively denoted as I21-I2n, such that load current I_LED at the adjusting control terminal of LED can be calculated by the following formula (8).

$$I\_\text{LED}=NT\_\text{on}<1>\cdot V\text{ref}/R21+NT\_\text{on}<2>\cdot V\text{ref}/R22+NT\_\text{on}<3>\cdot V\text{ref}/R23+ \ldots +NT\_\text{on}<n>\cdot V\text{ref}/R2n \quad (8)$$

Since reference voltage Vref can be determined by digital signal NT_all<1:n> and resistors R21 to R2n are both set values, load current I_LED may be determined by duty cycle D_pwm, where duty cycle D_pwm=NT_on<1:n>/NT_all<1:n>, thereby realizing dimming control by utilizing the duty cycle D_pwm of the pulse signal PWM.

For example, resistors R11 to R1n of resistor circuit 221 in reference voltage generating circuit 220 can be set as: $2^{n-1}\cdot R11=2^{n-2}\cdot R12= \ldots =2\cdot R1(n-1)=R1n=2^{n-1}\cdot Ra$, and resistors R21 to R2n in current adjusting circuit 230 can be set as: $2^{n-1}\cdot R2n= \ldots =2\cdot R22=R21=2^{n-1}\cdot Rb$, where Ra is a preset resistance unit value, and Rb is another preset resistance unit value. According to the structure of resistor circuit 221 shown in FIG. 6, equivalent resistance R1x of resistor circuit 221 can be calculated by the following formula (9).

$$R1x=NT_{all}<1:n>\cdot Ra \quad (9)$$

Therefore, reference voltage Vref can be calculated by the following formula (10) below.

$$V\text{ref}=(R\text{set}\cdot I\text{set}\cdot R\text{ref})/R1x=(R\text{set}\cdot I\text{set}\cdot R\text{ref})/(NT\_\text{all}<1:n>\cdot Ra) \quad (10)$$

For example, preset current Iset, resistor Rset, resistor Rref, and resistance unit value Ra may all be set values, and reference voltage Vref can be inversely proportional to digital signal NT_all<1:n>. According to the structure of current adjusting circuit 230 shown in FIG. 7, load current I_LED can be calculated by the following formula (11).

$$\begin{aligned}I\_\text{LED} &= NT\_\text{on}<1>\cdot V\text{ref}/R21+NT\_\text{on}<\\ &\quad 2>\cdot V\text{ref}/R22+\cdots+NT\_\text{on}<n>\cdot V\text{ref}/R2n=\\ &\quad V\text{ref}\cdot\left(NT_{on}<n>\tfrac{1}{Rb}+NT_{on}<n-1>\right.\\ &\quad \left.\tfrac{1}{2Rb}+\cdots+NT_{on}<1>\tfrac{1}{2^{n-1}Rb}\right)=\\ &\quad V\text{ref}\cdot(NT\_\text{on}<1:n>/2^{n-1}Rb)=(R\text{set}\cdot I\text{set}\cdot R\text{ref})\cdot NT\_\text{on}<\\ &\quad 1:n>/(NT\_\text{all}<1:n>\cdot 2^{n-1}Rb\cdot Ra)=[R\text{set}\cdot I\text{set}\cdot R\text{ref}/\\ &\quad (2^{n-1}Rb\cdot Ra)]\cdot(NT\_\text{on}<1:n>/NT\_\text{all}<1:n>)=[\\ &\quad R\text{set}\cdot I\text{set}\cdot R\text{ref}/(2^{n-1}Rb\cdot Ra)]\cdot D\_\text{pwm}\end{aligned} \quad (11)$$

For example, resistor Rset, current Iset, resistor Rref, resistance unit value Ra, and resistance unit value Rb may all be set/predetermined values, and load current I_LED can be determined by duty cycle D_pwm. Thus, when pulse signal PWM varies, load current I_LED can be adjusted with pulse signal PWM, in order to achieve dimming. In this example load current adjusting circuit, the counter can count the active level length and cycle length of pulse signal PWM to obtain digital signals NT_all<1:n> and NT_on<1:n> in order to represent the duty cycle of pulse signal PWM. Load current I_LED can be adjusted by current adjusting branches controlled by digital signal NT_on<1:n> and the reference voltage, such that load current I_LED can be related to the duty cycle of pulse signal PWM in order to realize dimming.

Because the passive filter is saved in certain embodiments, the area and the cost of the chip where the load current adjusting circuit is located can be substantially reduced as compared to other approaches. Further, when the frequency of the pulse signal PWM is constant, reference voltage Vref may not vary, and when the frequency of the pulse signal PWM varies, the bit of digital signal NT_all<1:n> can be left-shifted. The highest bit of digital signal NT_all<1:n> can be updated to be 1 during each cycle, such that a variation range of digital signal NT_all<1:n> may not be more than 2 times when the frequency of pulse signal PWM varies, thus guarantying a varying range of reference voltage Vref to not be more than 2 times.

While the bits of digital signal NT_all<1:n> are left-shifted, the bits of digital signal NT_on<1:n> should also be left-shifted in order to make digital signals NT_all<1:n> and NT_on<1:n> represent the duty cycle of pulse signal PWM. The bits of digital signal NT_all<1:n> may be left-shifted inside memory 215, and the bits of digital signal NT_on<1:n> may be left-shifted inside memory 216 or memory 217. As a result, reference voltage Vref in this example may not be related to duty cycle D_pwm, and reference voltage Vref may still have a relatively higher amplitude when duty cycle D_pwm is relatively small, thus avoiding an error that may be caused by an offset voltage, and realizing high-precision adjustment to the load current within a wide frequency range of pulse signal PWM.

Figure 8:
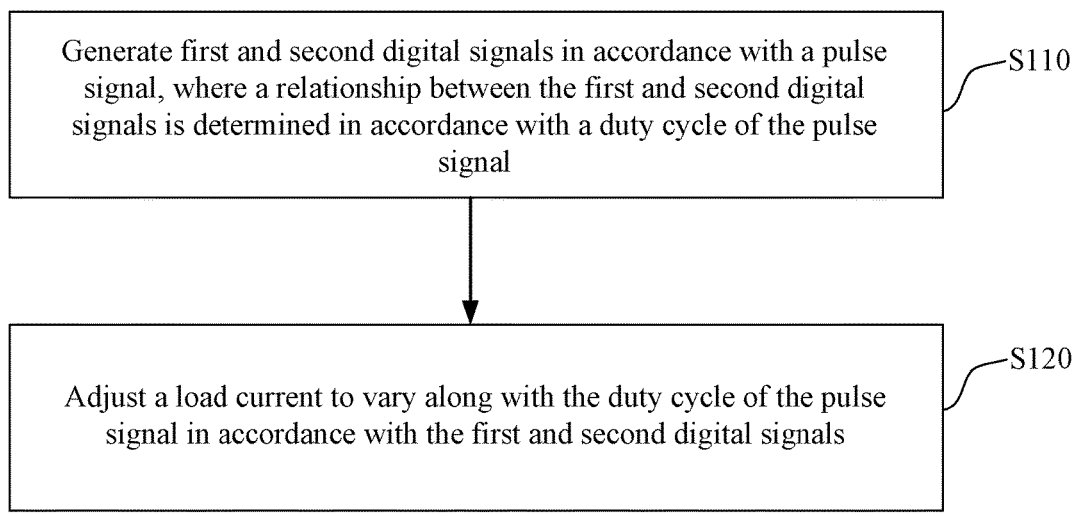
FIG. 8 is a flow diagram of an example adjusting method, in accordance with embodiments of the present invention.

Referring now to FIG. 8, shown is a flow diagram of an example adjusting method, in accordance with embodiments of the present invention. In this example, a load current can be adjusted in accordance with a pulse signal in order to achieve dimming. This adjusting can be utilized in the load current adjusting circuitry as discussed above. At S110, a first digital signal (e.g., NT_all<1:n>) and a second digital signal (e.g., NT_on<1:n>) can be generated in accordance with a pulse signal (e.g., PWM), and a relationship between the first and second digital signals may be determined in accordance with a duty cycle (e.g., D_pwm) of the pulse signal.

For example, in each cycle of the pulse signal, the first digital signal can represent a total length of a last cycle of the pulse signal, and the second digital signal may represent an active or an inactive level length of the last cycle of the pulse signal. The pulse signal can be counted in accordance with a clock signal in order to obtain a counting signal. The counting signal can be reset to an initial value at a first time after each cycle of the pulse signal starts, and the present counting signal can be stored as the first digital signal at a second time after each cycle of the pulse signal starts, where the second time precedes the first time during each cycle of the pulse signal.

The present counting signal can be stored as a characterizing signal at a third time after each cycle of the pulse signal starts, where the third time corresponds to a transition of the second level of the pulse signal in the present cycle. The present characterizing signal can be stored as the second digital signal at the second time during each cycle of the pulse signal, where the characterizing signal is equal to the counting signal corresponding to a transition of a second level of the pulse signal in the last cycle.

For example, the initial value can be determined in accordance with a duration between the second time and a start time of the pulse signal in each cycle of the pulse signal. At S120, the load current can be adjusted in accordance with the first and second digital signals, to vary along with the duty cycle of the pulse signal. For example, a reference voltage (e.g., Vref) can be generated in accordance with the first digital signal. Current adjustment branches can be controlled to be turned on/off in accordance with a corresponding bit in the second digital signal, where the load current is equal to a superimposed current of each branch current, and each branch current in each of the current adjusting branches that are turned on is adjusted according to the reference voltage.

Also for example, the reference voltage can be generated in accordance with the first digital signal, which may have a reverse change tendency with respect to said first digital signal. A "reverse change tendency" herein may imply that when the value of the first digital signal is reduced, the (analog) voltage level of the reference voltage increases, and when the value of the first digital signal is increased, the (analog) voltage level of the reference voltage decreases. When the second digital signal represents an active level length of the pulse signal, the load current can be adjusted in accordance with a change tendency of the second digital signal. A (non-reverse) "change tendency" herein may imply that when the value of the second digital signal is reduced, the (analog) current level of the load current decreases, and when the value of the second digital signal is increased, the (analog) current level of the load current increases. When the second digital signal represents an inactive level length of the pulse signal, the load current can be adjusted in accordance with a reverse change tendency of the second digital signal.

For example, adjusting the load current in accordance with the change tendency of the second digital signal when the second digital signal represents the active level length of the pulse signal can include controlling conduction currents in each current adjusting branch corresponding sequentially to a lowest bit to a highest bit of the second digital signal to progressively decrease. For example, the decreasing relation can be an equal decreasing relation of a common ratio of one-half, such that the load current is directly proportional to the second digital signal.

Also for example, adjusting the load current in accordance with the reverse change tendency of the second digital signal when the second digital signal represents the inactive level length of the pulse signal can include controlling conduction currents in each current adjusting branch corresponding sequentially to the lowest bit to the highest bit of the second digital signal to progressively increase. For example, the increasing relation can be an equal increasing relation of a common ratio of 2, such that the load current is inversely proportional to the second digital signal.

In particular embodiments, the active level length and the cycle length of the pulse signal PWM can be counted to obtain the first and second digital signals to represent the duty cycle of pulse signal PWM. In addition, the reference voltage generated in accordance with the first digital signal may not be related to the duty cycle, and the load current can be adjusted by controlling current adjusting branches in accordance with the second digital signal and the reference voltage. In this way, the load current can be related to the duty cycle of the pulse signal PWM in order to realize dimming. Because a passive filter may not be utilized in particular embodiments, the area and cost of the chip where the load current adjusting circuit is located are greatly saved. In addition, because reference voltage Vref herein may not be related to duty cycle D_pwm, when duty cycle D_pwm is relatively small, reference voltage Vref may still have a relatively high amplitude. This can substantially avoid errors that may be caused by the offset voltage, and can also realize high-precision adjustment of the load current within a wide frequency range of pulse signal PWM.

Also in particular embodiments, a method of adjusting a load current to drive a load, can include determining whether a duty cycle of a pulse signal is greater than a predetermined value, where the pulse signal can be configured as a PWM dimming signal, and the load can be configured as an LED lighting apparatus. The lightness of the LED lighting apparatus may be regulated in accordance with the PWM dimming signal. The predetermined value can be set in accordance with requirements of the lighting apparatus (e.g., one value from about 5% to about 45%). The method can also include converting the pulse signal to a reference voltage when the duty cycle is greater than the predetermined value.

The method can also include regulating the load current in accordance with the reference voltage to match the duty cycle of the pulse signal. The pulse signal may be converted to the reference voltage that represents the duty cycle of the pulse signal that is configured as a reference for the load current, and then the load current may be regulated (e.g., by a current loop circuit), in accordance with the reference voltage in order to make the lightness of the LED lighting apparatus be consistent with the duty cycle of the pulse signal. The method can also include converting the pulse signal to a modified pulse signal with an increased duty cycle when the duty cycle is less than the predetermined value.

When the duty cycle of the pulse signal is smaller, the modified pulse signal with an increased duty cycle may be generated (e.g., the duty cycle of the pulse signal is 10%, while the duty cycle of modified pulse signal is 90%, 9 times of the pulse signal). The method can also include controlling a duty cycle of a current flowing through the load in accordance with the modified pulse signal. For example, when the duty cycle of modified pulse signal is 90%, the duty cycle of a current flowing through the load can be controlled to be 90%. The method can also include regulating an average value of the current flowing through the load to control the load current to match the duty cycle of the pulse signal. The current may be controlled to flow through the load periodically in accordance with the modified pulse signal to make the average value of the current flowing through the load control the load current to match the duty cycle of the pulse signal.

Furthermore, the current provided to the load may be controlled to flow through the load periodically in accordance with the duty cycle of the modified pulse signal. The value of the current provided to the load may be controlled in accordance with a reference signal corresponding to the predetermined value and a ratio between the duty cycle of the modified pulse signal and that of the pulse signal. For example, when the predetermined value is set to be 30%, if the duty cycle of the pulse signal is 10%, the duty cycle of the modified pulse signal may be converted to be 90%. Correspondingly, the reference signal can be controlled to be $\frac{1}{27}$ of the reference voltage when the duty cycle of the pulse signal is 30%.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A load current adjusting circuit, comprising:
    a) a counter configured to generate first and second digital signals in accordance with a pulse signal, wherein a numerical relationship between said first and second digital signals is determined in accordance with a duty cycle of said pulse signal; and
    b) an adjusting circuit configured to adjust a load current to vary along with said duty cycle of said pulse signal in accordance with said first and second digital signals,
    c) wherein said first digital signal is configured to represent a total cycle length of said pulse signal, and said second digital signal is configured to represent an active or an inactive level length of said pulse signal.

2. The load current adjusting circuit of claim 1, wherein said counter comprises:
    a) a counting unit configured to count said pulse signal in accordance with a clock signal to obtain a counting signal, wherein said counting signal is reset to an initial value at a first time after each cycle of said pulse signal starts;
    b) a first memory configured to store a present counting signal as said first digital signal at a second time after each cycle of said pulse signal starts, wherein said second time precedes said first time during each cycle of said pulse signal; and
    c) a second memory configured to store a present characterizing signal as said second digital signal at said second time after each cycle of said pulse signal starts, wherein said characterizing signal is equal to said counting signal corresponding to a transition of a second level of said pulse signal in said last cycle.

3. The load current adjusting circuit of claim 2, wherein said counter further comprises:
    a) a first pulse generator configured to generate a first enable signal for said first memory, wherein during each cycle of said pulse signal, an active pulse of said first enable signal is not more than a time length between said first and second times; and
    b) a second pulse generator configured to generate a reset signal for said counting unit, wherein during each cycle of said pulse signal, said reset signal is active for a period of time from said first time.

4. The load current adjusting circuit of claim 2, wherein:
    a) said counter further comprises a third memory configured to store said present counting signal as said characterizing signal at a third time in each cycle of said pulse signal; and
    b) said third time corresponds to a transition of said second level of said pulse signal in said cycle.

5. The load current adjusting circuit of claim 2, wherein said initial value is determined in accordance with a duration between said second time and a start time of said pulse signal in each cycle of said pulse signal.

6. The load current adjusting circuit of claim 1, wherein said adjusting circuit comprises:
    a) a reference voltage generating circuit configured to generate a reference voltage in accordance with said first digital signal, wherein said reference voltage is controlled by said first digital signal; and
    b) a plurality of current adjusting branches, wherein on and off states of each of said current adjusting branches are controlled by a corresponding bit in said second digital signal, and change tendencies of each branch current in each of said current adjusting branches which are turned on and said reference voltage are the same, and a superimposed current of each branch current is equal to said load current.

7. The load current adjusting circuit of claim 6, wherein when each of said current adjusting branches is turned on, said branch current of each branch is different from each other.

8. The load current adjusting circuit of claim 7, wherein change tendencies of said reference voltage and said first digital signal are reverse.

9. A method of adjusting a load current, the method comprising:
   a) generating, by a counter, first and second digital signals in accordance with a pulse signal, wherein a numerical relationship between said first and second digital signals is determined by a duty cycle of said pulse signal; and
   b) adjusting, by an adjusting circuit, said load current to vary along with said duty cycle of said pulse signal in accordance with said first and second digital signals,
   c) wherein said first digital signal is configured to represent a total cycle length of said pulse signal, and said second digital signal is configured to represent an active or an inactive level length of said pulse signal.

10. The method of claim 9, further comprising:
    a) counting said pulse signal in accordance with a clock signal to obtain a counting signal, wherein said counting signal is reset to an initial value at a first time after each cycle of said pulse signal starts;
    b) storing said present counting signal as said first digital signal at a second time after each cycle of said pulse signal starts, wherein said second time precedes said first time during each cycle of said pulse signal;
    c) storing said present counting signal as a characterizing signal at a third time after each cycle of said pulse signal starts, wherein said third time corresponds to a transition of a second level of said pulse signal in said cycle; and
    d) storing said characterizing signal as said second digital signal at said second time during each cycle of said pulse signal, wherein said characterizing signal is equal to said counting signal corresponding to said transition of said second level of said pulse signal in said last cycle.

11. The method of claim 10, wherein said initial value is determined in accordance with a duration between said second time and a start time of said pulse signal in each cycle of said pulse signal.

12. The method of claim 9, further comprising:
    a) generating a reference voltage in accordance with said first digital signal;
    b) controlling a plurality of current adjusting branches to be turned on and off in accordance with a corresponding bit in said second digital signal, wherein said load current is equal to a superimposed current of each branch current in each of said current adjusting branches; and
    c) adjusting each branch current in each of said current adjusting branches that are turned on according to said reference voltage.

13. The method of claim 12, further comprising generating said reference voltage in accordance with said first digital signal, wherein said reference voltage has a reverse change tendency with respect to said first digital signal.

14. The method of claim 12, further comprising:
    a) adjusting said load current in accordance with a change tendency of said second digital signal when said second digital signal represents an active level length of said pulse signal; and
    b) adjusting said load current in accordance with a reverse tendency of said change tendency of said second digital signal when said second digital signal represents an inactive level length of said pulse signal.

15. The method of claim 14, further comprising controlling conduction currents in each current adjusting branch corresponding sequentially to a lowest bit through a highest bit of said second digital signal to progressively decrease.

16. The method of claim 15, further comprising controlling said conduction currents in said current adjusting branch corresponding sequentially to said lowest bit through said highest bit of said second digital signal to decrease with an equal decrease relationship of a common ratio of one-half, such that said load current is directly proportional to said second digital signal.

17. The method of claim 9, wherein said counter is configured to count said pulse signal in accordance with a clock signal to generate said first and second digital signals.

18. The method of claim 9, further comprising:
    a) generating a reference voltage representing a value of said load current corresponding to a switching period of said pulse signal; and
    b) generating said load current using a digital-to-analog converter (DAC) in accordance with said reference voltage and said second digital signal.

19. A method of adjusting a load current to drive a load, the method comprising:
    a) determining whether a duty cycle of a pulse signal is greater than a predetermined value;
    b) converting said pulse signal to a reference voltage when said duty cycle is greater than said predetermined value;
    c) regulating said load current in accordance with said reference voltage to match said duty cycle of said pulse signal;
    d) converting said pulse signal to a modified pulse signal with an increased duty cycle when said duty cycle is not greater than said predetermined value;
    e) controlling a duty cycle of a current flowing through said load in accordance with said modified pulse signal; and
    f) regulating an average value of said current flowing through said load to control said load current to match said duty cycle of said pulse signal.

20. The method of claim 19, further comprising controlling said load current in accordance with said modified pulse signal and a reference signal corresponding to said predetermined value to match said duty cycle of said pulse signal when said duty cycle is less than said predetermined value.

* * * * *